United States Patent
Maranville et al.

(10) Patent No.: US 9,789,914 B1
(45) Date of Patent: Oct. 17, 2017

(54) VEHICLE TAILGATE SYSTEM

(71) Applicant: FORD GLOBAL TECHNOLOGIES, LLC, Dearborn, MI (US)

(72) Inventors: Clay Wesley Maranville, Ypsilanti, MI (US); David Anthony Wagner, Northville, MI (US); John Wayne Jaranson, Dearborn, MI (US); Richard H. Wykoff, II, Commerce Township, MI (US); Patrick James Blanchard, Ann Arbor, MI (US); Peter A. Friedman, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/400,450

(22) Filed: Jan. 6, 2017

(51) Int. Cl.
 *B62D 33/03* (2006.01)
 *B62D 33/027* (2006.01)
 *B62D 33/037* (2006.01)

(52) U.S. Cl.
 CPC ......... *B62D 33/03* (2013.01); *B62D 33/0273* (2013.01); *B62D 33/037* (2013.01)

(58) Field of Classification Search
 CPC .. B62D 33/03; B62D 33/0273; B62D 33/037; B62D 33/023; B62D 33/027
 USPC .................................................. 296/50, 57.1
 See application file for complete search history.

(56) References Cited

U.S. PATENT DOCUMENTS

| | | | |
|---|---|---|---|
| 5,169,202 A * | 12/1992 | Cupp | B60P 1/435 269/900 |
| 5,312,150 A | 5/1994 | Quam | |
| 5,352,008 A * | 10/1994 | Denvir | B62D 35/001 296/180.1 |
| 6,575,516 B2 * | 6/2003 | Webber | B60P 1/43 14/69.5 |
| 6,588,822 B1 | 7/2003 | Duvall, Jr. | |
| 6,994,363 B2 | 2/2006 | Seksaria et al. | |
| 7,338,107 B1 | 3/2008 | Wilcox et al. | |
| 7,533,920 B2 | 5/2009 | Ohly | |
| 7,625,031 B2 | 12/2009 | Ohly | |
| 8,348,325 B2 | 1/2013 | Hausler et al. | |
| 8,696,046 B2 | 4/2014 | Sackett | |
| 8,764,090 B2 | 7/2014 | Kerr | |
| 9,097,045 B2 | 8/2015 | Hausler et al. | |
| 2007/0182193 A1 | 8/2007 | Fournier | |
| 2007/0216195 A1 | 9/2007 | Furman | |
| 2008/0054667 A1 | 3/2008 | Ohly | |
| 2008/0054668 A1 | 3/2008 | Wilcox | |
| 2008/0185861 A1 | 8/2008 | Johnson | |

(Continued)

FOREIGN PATENT DOCUMENTS

WO    2007087573 A2    8/2007

*Primary Examiner* — Dennis H Pedder

(74) *Attorney, Agent, or Firm* — Jason Rogers; Brooks Kushman P.C.

(57) ABSTRACT

A vehicle tailgate includes a frame, pair of hinges, inner tailgate panel, and outer tailgate panel. The frame has a first outer side-member and a second outer side-member. Each of the outer side-members is secured to ends of a lower outer cross-member. The outer side-members each have an internal surface and an external surface. The internal surfaces define T-slots. One of the pair of hinges is secured to each external surface of the outer side-members. The inner and outer tailgate panels are secured to opposing outer sides of the frame such that the external surfaces of the outer side-members remain exposed.

20 Claims, 2 Drawing Sheets

(56) References Cited

U.S. PATENT DOCUMENTS

2012/0104786 A1  5/2012  Wimberley
2015/0014502 A1  1/2015  McCaughan
2015/0239372 A1  8/2015  Bauer

* cited by examiner

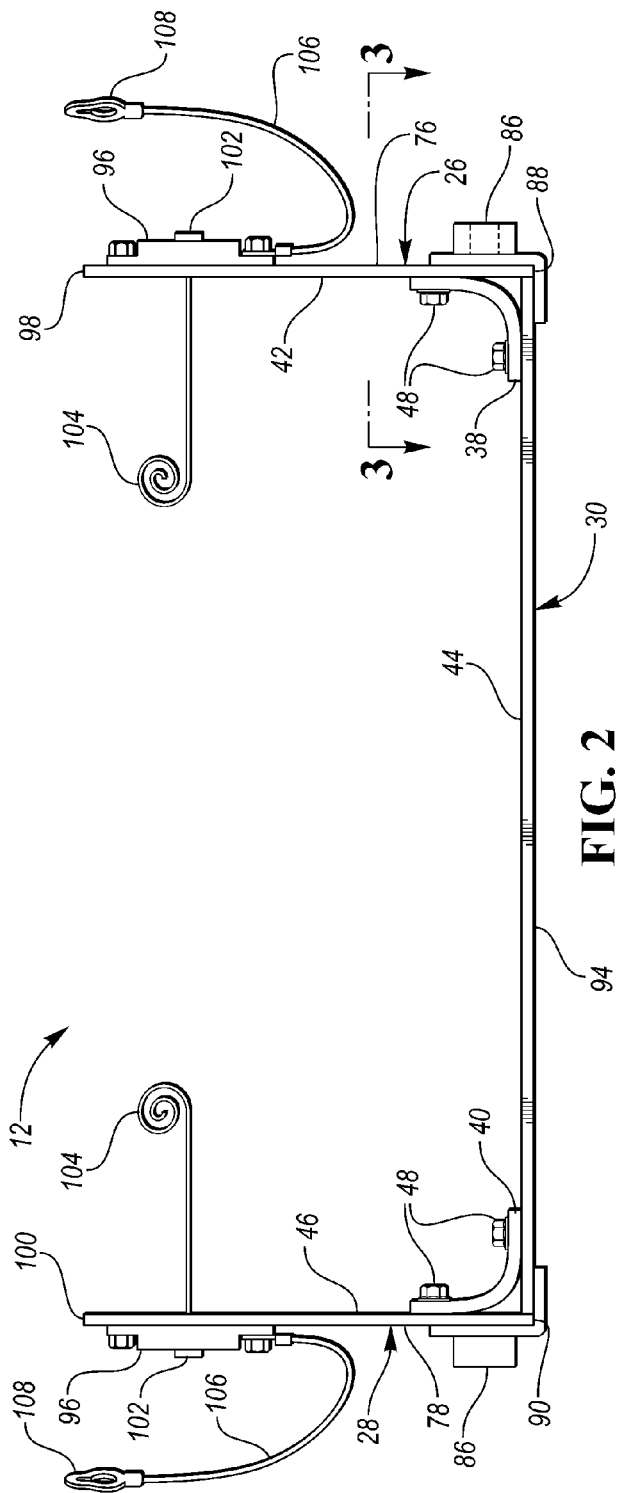
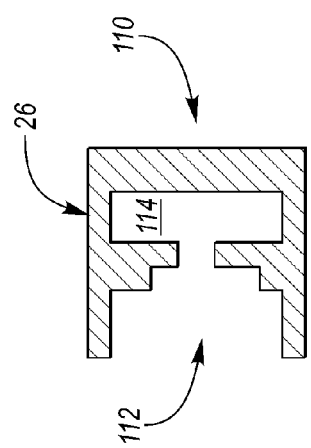

VEHICLE TAILGATE SYSTEM

TECHNICAL FIELD

The present disclosure relates to tailgate structures for vehicles such as automobiles and trucks.

BACKGROUND

Automobiles, including trucks, may include tailgates that provide access to storage areas such as truck beds.

SUMMARY

A vehicle tailgate includes a frame, pair of hinges, inner tailgate panel, and outer tailgate panel. The frame has a first outer side-member and a second outer side-member. Each of the outer side-members is secured to ends of a lower outer cross-member. The outer side-members each have an internal surface and an external surface. The internal surfaces define T-slots. One of the pair of hinges is secured to each external surface of the outer side-members. The inner and outer tailgate panels are secured to opposing outer sides of the frame such that the external surfaces of the outer side-members remain exposed.

A tailgate frame includes a first side member, second side member, lower cross-member, and pair of hinges. The first and second side-members each extend from a lower end to an upper end. Each side-member has an internal surface and an external surface. The internal surfaces define T-slots. A lower cross-member extends between and is secured to each of the lower ends. One of the pair of hinges is secured to each external surface of the first and second side members proximate the lower ends.

A vehicle tailgate includes a frame, pair of hinges, pair of latches, pair of lowering straps, upper outer cross-member, inner cross-member, plurality of accessory mounting brackets, inner tailgate panel, and outer tailgate panel. The frame has first and second outer side-members each secured to ends of a lower outer cross-member. The outer side-members have internal and external surfaces. The internal surfaces define T-slots. One of the pair of hinges is secured to each external surface of the first and second outer side-members. One of the pair of latches is secured to each external surface of the first and second outer side-members. One of the pair of lowering straps is secured to each external surface of the first and second outer side-members. The upper outer cross-member is secured to each of the first and second outer side-members. The inner cross-member extends between and is secured to the first and second outer side-members between the upper and lower outer cross-members. The plurality of accessory mounting brackets is secured to and spans the inner and upper outer cross-members between the first and second outer side-members. The inner and outer tailgate panels are secured to opposing outer sides of the frame such that the external surfaces of the outer side-members remain exposed. The inner and outer tailgate panels also define access holes that expose the accessory mounting brackets.

BRIEF DESCRIPTION OF THE DRAWINGS

FIG. 2 is a front plan view of portions of an internal frame of the vehicle tailgate; and FIG. 3 is a cross-sectional view taken along line 3-3 in FIG. 2.

DETAILED DESCRIPTION

Figure 1:
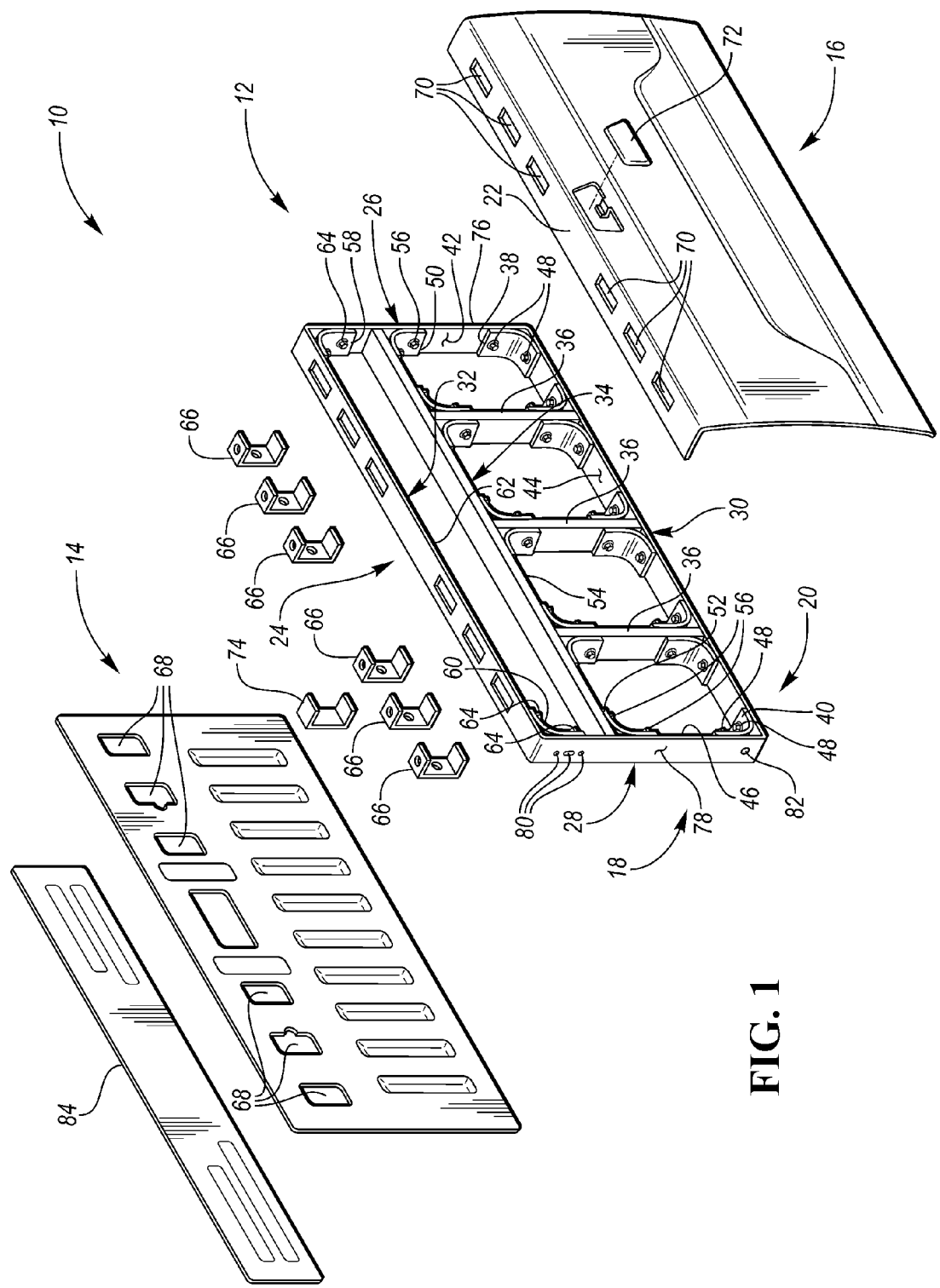
FIG. 1 is an exploded view of a vehicle tailgate.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIG. 1, an exploded view of a vehicle tailgate 10 is illustrated. The tailgate 10 may be a tailgate for truck bed. The tailgate 10 includes an internal frame 12. Tailgate 10 also includes an inner tailgate panel 14 in an outer tailgate panel 16. The inner panel 14 and outer panel 16 may be secured to a first outer side 18 of the frame 12 and a second outer side 20 of the frame 12, respectively. The first outer side 18 and second outer side 20 may be opposing sides of the frame 12. The outer panel 16 may also include a top section 22 that is secured to a top 24 of the frame 12. The top 24 of the frame may be substantially perpendicular to the first outer side 18 and second outer side 20 of the frame. Substantially perpendicular includes all incremental values between 80° and 100°. The inner panel 14 may face internally relative to a vehicle or truck bed when the tailgate 10 is installed on the vehicle or truck bed. The outer panel 16 may face externally relative to a vehicle or truck bed when the tailgate 10 is installed on the vehicle or truck bed. The inner panel 14 and the outer panel 16 may be secured to the frame by a welding process or by a series of fasteners which may include bolts, rivets, screws, or any other fastener known in the art.

The frame 12 may include a first outer side-member 26 and a second outer side-member 28. The first outer side-member 26 and second outer side-member 28 may each be secured to a lower outer cross-member 30. More specifically, opposing outer ends of the lower outer cross-member 30 may be secured to lower ends of the first outer side-member 26 and second outer side-member 28 such that the lower outer cross-member 30 extends between and spans the first outer side-member 26 and second outer side-member 28. The first outer side-member 26 and second outer side-member 28 may also be secured to an upper outer cross-member 32. More specifically, opposing outer ends of the upper outer cross-member 32 may be secured to upper ends of the first outer side-member 26 and second outer side-member 28 such that the upper outer cross-member 32 extends between and spans the first outer side-member 26 and second outer side-member 28. The frame 12 may also include an inner (or intermediate) cross-member 34 that is secured to the first outer side-member 26 and second outer side-member 28. The inner cross-member 34 may also extend between and span the first outer side-member 26 and second outer side-member 28. The inner cross-member 34 may also be disposed between the lower outer cross-member 30 and the upper outer cross-member 32. A plurality of reinforcement members 36 may be secured to lower outer cross-member 30 and the inner cross-member 34. The plurality of reinforcement members 36 may extend between and span both the lower outer cross-member 30 and the inner cross-member 34.

The first outer side-member 26, second outer side-member 28, lower outer cross-member 30, upper outer cross-member 32, inner cross-member 34, and plurality of reinforcement members 36 may all be secured to each other in the configuration of FIG. 1 by a plurality of fasteners. The first outer side-member 26 and second outer side-member 28 may define T-slots that are configured to receive T-nuts and/or T-bolts. The lower outer cross-member 30, upper outer cross-member 32, and inner cross-member 34 may each be secured to both the first outer side-member 26 and second outer side-member 28 by fasteners that engage the T-slots defined in the first outer side-member 26 and second outer side-member 28.

A first gusset 38 and a second gusset 40 may secure the lower outer cross-member 30 to the first outer side-member 26 and the second outer side-member 28, respectively. The first gusset 38 may be secured to an internal surface 42 of the first outer side-member 26 and an internal (or inner) surface 44 of the lower outer cross-member 30. The second gusset 40 may be secured to an internal surface 46 of the second outer side-member 28 and the internal surface 44 of the lower outer cross-member 30. A first set of fasteners 48 may be used to secure the first gusset 38 to the first outer side-member 26 and lower outer cross-member 30. The first set of fasteners 48 may also be used to secure the second gusset 40 to the second outer side-member 28 and the lower outer cross-member 30. The first set of fasteners 48 may include T-bolt and nut combinations and/or bolt and T-nut combinations that engage the T-slots in the first outer side-member 26 and second outer side-member 28. The lower outer cross-member 30 may also define T-slots and the first set of fasteners 48 may also engage the T-slot in the lower outer cross-member 30.

A third gusset 50 and a fourth gusset 52 may secure the inner cross-member 34 to the first outer side-member 26 and to the second outer side-member 28, respectively. The third gusset 50 may be secured to the internal surface 42 of the first outer side-member 26 and a lower surface 54 of the inner cross-member 34. The fourth gusset 52 may be secured to the internal surface 46 of the second outer side-member 28 and the lower surface 54 of the inner cross-member 34. A second set of fasteners 56 may be used to secure the third gusset 50 to the first outer side-member 26 and inner cross-member 34. The second of fasteners 56 may also be used to secure the fourth gusset 52 to the second outer side-member 28 and the inner cross-member 34. The second set of fasteners 56 may include T-bolt and nut combinations and/or bolt and T-nut combinations that engage the T-slots in the first outer side-member 26 and second outer side-member 28. The inner cross-member 34 may also define T-slots and the second set of fasteners 56 may also engage the T-slot in the inner cross-member 34.

A fifth gusset 58 and a sixth gusset 60 may secure the upper outer cross-member 32 to the first outer side-member 26 and to the second outer side-member 28, respectively. The fifth gusset 58 may be secured to the internal surface 42 of the first outer side-member 26 and an internal surface 62 of the upper outer cross-member 32. The sixth gusset 60 may be secured to the internal (or inner) surface 46 of the second outer side-member 28 and the internal surface 62 of the upper outer cross-member 32. A third set of fasteners 64 may be used to secure the fifth gusset 58 to the first outer side-member 26 and upper outer cross-member 32. The third set of fasteners 64 may also be used to secure the sixth gusset 60 to the second outer side-member 28 and the upper outer cross-member 32. The third set of fasteners 64 may include T-bolt and nut combinations and/or bolt and T-nut combinations that engage the T-slots in the first outer side-member 26 and second outer side-member 28. The upper outer cross-member 32 may also define T-slots and the third set of fasteners 64 may also engage the T-slot in the upper outer cross-member 32.

Additional gussets may be used to secure the plurality of reinforcement members 36 to the lower outer cross-member 30 and the inner cross-member 34. The plurality of reinforcement members 36 may also define T-slots and fasteners may engage the T-slots to secure the additional gussets to the plurality of reinforcement members 36, lower outer cross-member 30 and the inner cross-member 34.

A plurality of accessory mounting brackets 66 may be secured to and span the upper outer cross-member 32 and inner cross-member 34 between the first outer side-member 26 and second outer side-member 28. The accessory mounting brackets 66 may have sections that form a C-shaped configuration. The accessory mounting brackets 66 may define orifices on upper surfaces that face the top 24 of the frame 12 that are configured to receive fasteners for mounting accessories. The accessory mounting brackets 66 may also define orifices on back surfaces that face the inner panel 14 that are also configured to receive fasteners for mounting accessories. The accessory mounting brackets 66 may also include weld nuts that are secured to the upper surfaces that face the top 24 of the frame 12 and/or the back surfaces that face the inner panel 14 that are configured to receive bolts for mounting accessories. The inner panel 14 may define a first set of access holes 68 that expose the back surfaces of the accessory brackets 66. The top section 22 of the outer panel 16 may define a second set of access holes 70 that expose the upper surfaces of the accessory brackets 66. The upper outer cross-member 32 may also define access holes that are aligned with the second set of access holes 70 when the outer panel 16 is secured to the frame 12.

The tailgate 10 may include a handle 72 that is configured to transition a pair of latches between locked and unlocked positions. A handle/latch reinforcement anchor 74 may be disposed between the upper outer cross-member 32 and the inner cross-member 34 to provide stability to the tailgate 10 proximate the handle 72. An external surface 76 of the first outer side-member 26 and an external surface 78 of the second outer side-member 28 may each define attachment points for a latch which may include latch mounting holes 80. The external surface 76 of the first outer side-member 26 and the external surface 78 of the second outer side-member 28 may also each define attachment points for a hinge which may include hinge mounting holes 82. The external surface 76 of the first outer side-member 26 and the external surface 78 of the second outer side-member 28 may each remain exposed when the inner panel 14 and the outer panel 16 are secured to the frame. A latch handle close out panel 84 may secured to an internal side of the inner panel 14 to conceal a latching mechanism that extends from the handle 72 to the latch mounting holes 80. The latch mechanism may be disposed between the upper outer cross-member 32 and the inner cross-member 34. The latch handle close out panel 84 may be secured to the inner panel 14 via fasteners so that it may be removed to gain access to the latch mechanism and/or the back surfaces of the accessory brackets 66 via the access holes 68.

The several components of the frame 12, including the first outer side-member 26, second outer side-member 28, lower outer cross-member 30, upper outer cross-member 32, inner cross-member 34, and plurality of reinforcement members 36, may also include structurally reinforced attachment points for mounting accessories. The structurally reinforced attachment points may be located on any surface of the several components and may be positioned based on the desired application. The structurally reinforced attachment points may define orifices or include weld nuts that are configured to receive bolts for mounting accessories.

Referring to FIG. 2 portions of the internal frame 12 are illustrated. A pair of hinges 86 may be secured to the frame 12. One of the pair of hinges may be secured the external surface 76 of the first outer side-member 26, proximate to a lower end 88 of the first outer side-member 26, while the other of the pair of hinges may be secured the external surface 78 of the second outer side-member 28 proximate to a lower end 90 of the second outer side-member 28. The hinges 86 may be secured to the first outer side-member 26 and second outer side-member 28 by fasteners that engage the hinge mounting holes 82. The hinges may comprise two solid pins. Alternatively, one the hinges may be a solid pin while the other is C-shaped. The hinges 86 may comprise a pivoting axis for the tailgate 10 once installed so that the tailgate may transition between opened and closed positions. The hinges 86 may be affixed to L-shaped brackets 92. One L-shaped brackets may be secured to the external surface 76 of the first outer side-member 26 and an outer surface 94 of the lower outer cross-member 30, while the other L-shaped bracket may be secured to the external surface 78 of the second outer side-member 28 and the outer surface 94 of the lower outer cross-member 30. The L-shaped brackets 92 may be secured to the first outer side-member 26, second outer side-member 28, and lower outer cross-member 30 by fasteners.

A pair of latches 96 may be secured to the frame 12. One of the pair of latches may be secured to the external surface 76 of the first outer side-member 26, proximate to an upper end 98 of the first outer side-member 26, while the other of the pair of latches may be secured the external surface 78 of the second outer side-member 28 proximate to an upper end 100 of the second outer side-member 28. The latches 96 may be secured to the first outer side-member 26 and second outer side-member 28 by fasteners that engage the latch mounting holes 80. The latches 96 may include locking pins 102 that are configured to slide inward and outward in order to engage another part of a vehicle that the tailgate is attached to in order to prevent the tailgate 10 from rotating about the hinges 86. The locking pins 102 may be connected to the handle 72 by cables 104. The cables may be disposed between the upper outer cross-member 32 and the inner cross-member 34. The cables 104 may be configured to pull on the locking pins 102 so that they slide inward when a user pulls on the handle 72. When locking pins 102 slide inward they disengage and allow the tailgate 10 to rotate about the hinges 86.

A pair of lowering straps 106 may be secured to the frame 12. One of the pair of lowering straps may be secured to the external surface 76 of the first outer side-member 26, proximate to the upper end 98 of the first outer side-member 26, while the other of the pair of lowering straps may be secured the external surface 78 of the second outer side-member 28 proximate to the upper end 100 of the second outer side-member 28. The lowering straps 106 may be secured to the first outer side-member 26 and second outer side-member 28 by fasteners. The lowering straps 106 may be secured to another part of a vehicle (e.g., a truck bed) in order to limit an open position of the tailgate 10. The lowering straps 106 may include clips 108 that define orifices. Fasteners may be passed through the orifices defined by the clips 108 and engage another part of a vehicle in order to secure the lowering straps 106 to the other part of the vehicle.

Referring to FIG. 3 a cross-sectional view taken along line 3-3 in FIG. 2 is illustrated. FIG. 3 illustrates a cross-section of the first outer side-member 26. The first outer side-member 26 includes a closed end 110 and an opened end 112. The opened end 112 provides access to a T-slot 114 so that a fastener, such as a bolt and T-nut combination, may engage the T-slot 114 so that various components can be mounted to the first outer side-member 26. It should be understood that the second outer side-member 28 will have cross-section that is the mirror image of cross-section of the first outer side-member 26 such that the open ends of the first outer side-member 26 and second outer side-member 28 will face each other. Other components such as the lower outer cross-member 30, upper outer cross-member 32, inner cross-member 34, and plurality of reinforcement members 36, may include similar cross-sections that define T-slots. The orientation of these other components may be dependent on the direction that is required for a fastener to engage the T-slot.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle tailgate comprising:
   a frame having first and second outer side-members each secured to ends of a lower outer cross-member, the outer side-members having internal and external surfaces wherein the internal surfaces define T-slots;
   a pair of hinges, one of the pair secured to each external surface; and
   inner and outer tailgate panels secured to opposing outer sides of the frame such that the external surfaces remain exposed.

2. The vehicle tailgate of claim 1 further comprising a pair of latches, one of the pair of latches secured to each external surface.

3. The vehicle tailgate of claim 1 further comprising a pair of lowering straps, one of the pair of lowering straps secured to each external surface.

4. The vehicle tailgate of claim 1 further comprising first and second gussets secured to the internal surfaces of the first and second outer side-members, respectively, and the lower outer cross-member by a first set of fasteners that engage the T-slots in the first and second outer side-members and an inner surface of the lower outer cross-member.

5. The vehicle tailgate of claim 4 further comprising an upper outer cross-member secured to each of the first and second outer side-members.

6. The vehicle tailgate of claim 5 further comprising third and fourth gussets secured to the internal surfaces of the first and second outer side-members, respectively, and the upper outer cross-member by a second set of fasteners that engage the T-slots in the first and second outer side-members and an inner surface of the upper outer cross-member.

7. The vehicle tailgate of claim 6 further comprising an inner cross-member extending between and secured to the first and second outer side-members between the upper and lower outer cross-members by a third set of fasteners that engage the T-slots in the first and second outer side-members.

8. The vehicle tailgate of claim 7 further comprising a plurality of reinforcement members secured to and spanning the inner and lower outer cross-members between the first and second outer side-members.

9. The vehicle tailgate of claim 8 further comprising a plurality of accessory mounting brackets secured to and spanning the inner and upper outer cross-members between the first and second outer side-members, the accessory mounting brackets defining at least one orifice configured to receive a fastener.

10. The vehicle tailgate of claim 9, wherein the inner and outer tailgate panels define access holes that expose the accessory mounting brackets.

11. A tailgate frame comprising:
first and second side-members each extending from a lower to an upper end, each side-member having internal and external surfaces, the internal surfaces defining T-slots;
a lower cross-member extending between and secured to each of the lower ends; and
a pair of hinges, one of the pair secured to each external surface proximate the lower ends.

12. The tailgate frame of claim 11, wherein the hinges are affixed to L-shaped brackets that are secured to external surfaces of the side members and an outer surface of the lower cross-member.

13. The tailgate frame of claim 11 further comprising first and second gussets secured to the internal surfaces of the first and second side-members, respectively, and the lower cross-member by a first set of fasteners that engage the T-slots in the first and second side-members and an inner surface of the lower cross-member.

14. The tailgate frame of claim 13 further comprising an upper cross-member secured to each of the upper ends.

15. The tailgate frame of claim 14 further comprising third and fourth gussets secured to the internal surfaces of the first and second side-members, respectively, and the upper cross-member by a second set of fasteners that engage the T-slots in the first and second side-members and an inner surface of the upper cross-member.

16. The tailgate frame of claim 15 further comprising an intermediate cross-member secured to the first and second side-members between the lower cross-member and the upper cross-member.

17. The tailgate frame of claim 16 further comprising a plurality of accessory mounting brackets secured to and spanning the intermediate and upper cross-members between the first and second side-members, the accessory mounting brackets defining at least one orifice configured to receive a fastener.

18. The tailgate frame of claim 11 further comprising a pair of latches, one of the pair of latches secured to each external surface proximate the upper ends.

19. The tailgate frame of claim 11 further comprising a pair of lowering straps, one of the pair of lowering straps secured to each external surface proximate the upper ends.

20. A vehicle tailgate comprising:
a frame having first and second outer side-members each secured to ends of a lower outer cross-member, the outer side-members having internal and external surfaces wherein the internal surfaces define T-slots;
a pair of hinges, one of the pair of hinges secured to each external surface;
a pair of latches, one of the pair of latches secured to each external surface;
a pair of lowering straps, one of the pair of lowering straps secured to each external surface;
an upper outer cross-member secured to each of the first and second outer side-members;
an inner cross-member extending between and secured to the first and second outer side-members between the upper and lower outer cross-members;
a plurality of accessory mounting brackets secured to and spanning the inner and upper outer cross-members between the first and second outer side-members; and
inner and outer tailgate panels secured to opposing outer sides of the frame such that the external surfaces remain exposed, the inner and outer tailgate panels defining access holes that expose the accessory mounting brackets.

* * * * *